United States Patent [19]

Menke

[11] 4,026,341
[45] May 31, 1977

[54] TWO-PART NUT
[75] Inventor: Manfred Menke, Bremen, Germany
[73] Assignee: ERNO Raumfahrttechnik GmbH, Bremen, Germany
[22] Filed: Dec. 15, 1975
[21] Appl. No.: 640,691
[30] Foreign Application Priority Data
Dec. 19, 1975 Germany .................. 2460061
[52] U.S. Cl. .................. 151/41.74; 85/32 K
[51] Int. Cl.² .................. F16B 39/00
[58] Field of Search .......... 151/41.7, 41.74, 41.71; 85/32 K

[56] References Cited
UNITED STATES PATENTS

| 2,879,820 | 3/1959 | Trzcinski | 151/41.71 |
| 3,177,916 | 4/1965 | Rosan | 151/41.74 |

FOREIGN PATENTS OR APPLICATIONS

| 112,593 | 3/1941 | Australia | 85/32 K |
| 725,964 | 1/1966 | Canada | 151/41.7 |
| 2,162,609 | 6/1973 | Germany | 151/41.7 |
| 536,553 | 5/1941 | United Kingdom | 151/41.74 |
| 594,735 | 11/1947 | United Kingdom | 151/41.7 |
| 555,783 | 9/1943 | United Kingdom | 85/32 K |
| 579,552 | 8/1946 | United Kingdom | 85/32 K |
| 495,976 | 11/1938 | United Kingdom | 151/41.74 |
| 605,698 | 7/1948 | United Kingdom | 85/32 K |

Primary Examiner—Roy D. Frazier
Assistant Examiner—Thomas J. Holko
Attorney, Agent, or Firm—Ralf H. Siegemund

[57] ABSTRACT

The two-part nut has a socket member and a member with an internally threaded shank and a flange which is received in a transverse groove in the socket member having a central bore traversed by the shank. The shank has a groove adjacent the flange into which reach upset portions of the socket member to hold the members together with play. The socket member has alternate bores for riveting.

2 Claims, 3 Drawing Figures

TWO-PART NUT

BACKGROUND OF THE INVENTION

The present invention relates to a two-part nut having a socket member to be riveted to construction parts or the like and having additionally a member with internal threading for threading, for example, to a bolt which in turn is connected to another construction part.

Nut constructions of the type to which the invention pertains are used, for example, in lightweight construction engineering whereby particularly parts are to be interconnected for example by a threaded or threading connection of which, however, the female or nut part is no longer accessible after the connection has been made. The socket member of this two-part nut, as stated, is to be connected for example to one of the construction parts but the threaded member should still be movable to some extent relative to the socket member, of course, only within rather small limits but sufficient to offset any tolerances, for example, in the construction parts to be so interconnected.

Such a two-part nut has, as stated, a socket member which is the rivet part and is riveted to one of the construction parts. The socket member is usually a stamped piece or a punched piece and has three bores, two of which receive rivets, and the central, usually the largest bore is connected to the threaded member of this two-part nut. Two lugs or tabs with slots are disposed respectively on both sides of the central bore by means of which the socket member is connected to the threaded member. The latter has a flange which is inserted into the slots, and the connection permits some play of socket and threaded members in relation to each other. However, the engagement is also a lock to prevent turning of the two parts of the members relative to each other.

This known construction for a two-part nut has a significant disadvantage in that the two lugs or tabs often bend back after riveting so that the flange of the threaded member may slip out of one or even both of the slots. This, in turn, leads frequently to a loss of this particular nut which is quite detrimental if in fact the nut is no longer accessible. Moreover, the known two-part nuts are expensive to make and a since a large number of them are used, for example, in an aircraft or a space vehicle, they constitute together a considerable cost item.

DESCRIPTION OF THE INVENTION

It is an object of the present invention to provide a new and improved two-part nut having a socket member for riveting and a threaded member, which two members are to be connected to each other in a manner so that subsequent riveting will not cause disconnection. Moreover, the parts should be made less expensively.

It is a specific object of the present invention to improve a two-part nut construction which includes a socket being provided with three bores and having, furthermore, a threaded member which is inserted in the central one of the three bores.

In accordance with the preferred embodiment of the present invention, it is suggested to provide a groove in the socket member so that the central bore apears in the bottom of that groove. The threaded member has an internally threaded shank and has a flange with two parallel edges being spaced slightly less than the groove in the socket member is wide; moreover, the flange is thinner than this groove is deep. The shank of the threaded member has an outer annular groove situated just above the flange, and the outer diameter of this threaded shank portion or member is such that it just fits through the central bore of the socket member. The connection is effected by inserting the threaded shank into the socket member so that the flange is situated in the groove of the socket member, and the latter is upset adjacent its central groove so that two opposite portions of the socket member locate in the said annular groove. Additionally, the threaded member may have another groove which permits local upsetting in 120° spaced apart points to lock a threadedly received bolt to the threaded member.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
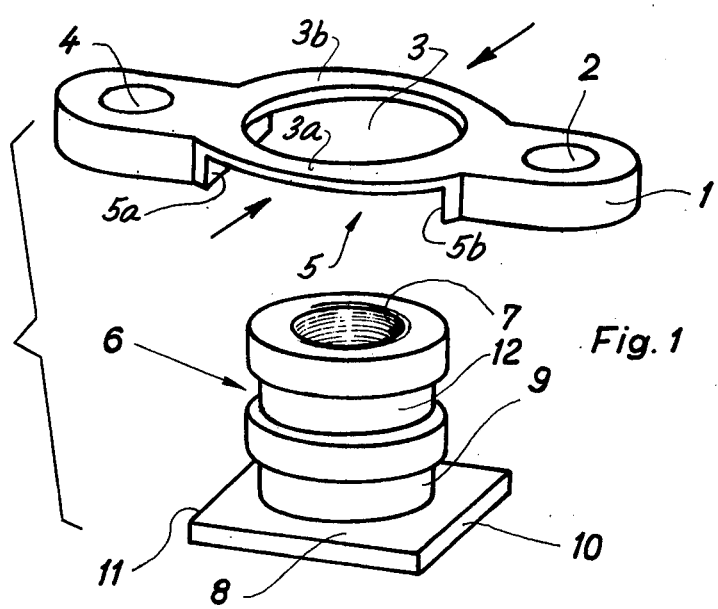
FIG. 1 is a perspective view of the two members of a two-part nut made in accordance with the preferred embodiment of the invention and illustrated prior to making up the connections.
Figure 2:
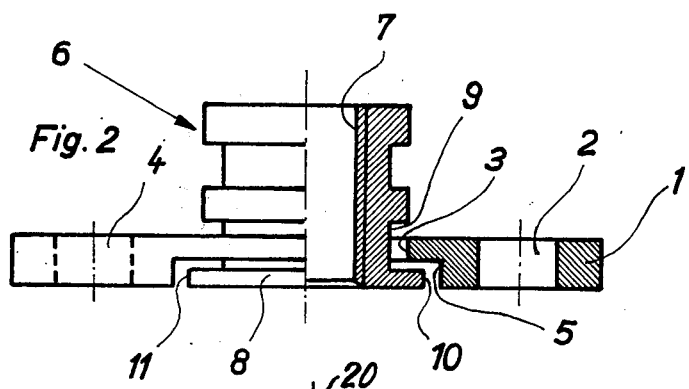
FIG. 2 is a side view, partially a section view, of the two members when interconnected.
Figure 3:
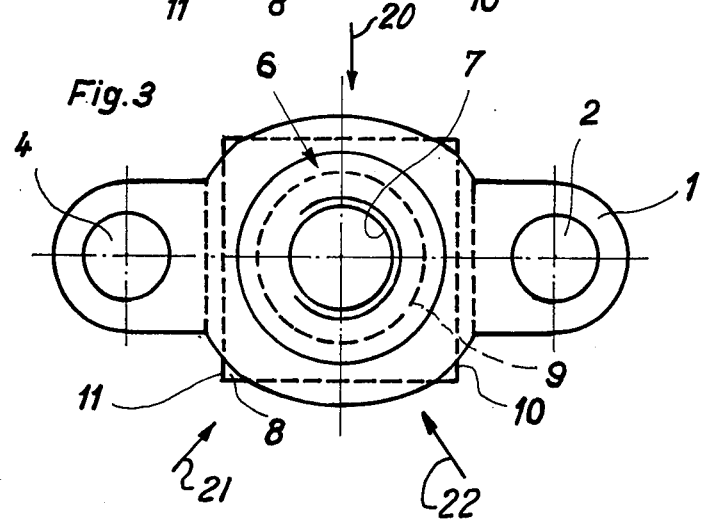
FIG. 3 is a top view of the nut as shown in FIG. 2.

Proceeding now to the detailed description of the drawings, the figures show a socket member 1 and a threaded member 6. The socket member 1 has a central, rather wide portion with a bore 3, and a groove 5 has been cut into the member 1 on one side so that the bore 3 traverses this groove centrally. The groove itself traverses the member laterally and has two straight parallel surfaces 5a and 5b. As a consequence, the ends of the member 1 are joined in effect through two, curved, bar-like segments 3a and 3b. The ends of member 1 are provided with two bores 2 and 4 respectively which receive rivets by means of which part 1 is riveted for example to a construction part of the like.

The threaded member 6 has a tubular shank with threaded interior 7 and an axial end flange 8. The flange 8 is of square shaped configuration which is a convenient contour but not essential except that the flange must have two parallel edges 10 and 11 which are spaced apart slightly less than the slot 5 (spacing of boundary surfaces 5a, 5b) is wide. The shank portion of member 6 has an annular groove 9 directly above flange 8, and another annular groove 12 is provided closer to the other end of the shank.

The two members are assembled as follows. The member 6 is inserted in bore 3, i.e., it has a diameter just about equal or slightly less than the diameter of the bore 3 permitting merely sufficient clearance for insertion. The groove 9 has a depth sufficient to permit play when the shank of member 6 has been received by bore 3. The segments 3a and 3b will now be upset (see arrows in FIG. 1), i.e., their curvature is reduced, and they are in effect being inserted to some extent into groove 9 and from opposite ends without, however, touching the bottom of the groove 9. Thus, member 6 can no longer be removed from socket member 1 but segments 3a and 3b are not flattened as they should merely prevent the parts 1 and 6 from separating without significantly reducing the play permitted by the depth of groove 9. Following threading of member 6 onto a bolt (not shown) member 6 may be radially upset in three 120° spaced apart locations in the level of groove 12 and as indicated by arrows 20, 21, and 22 to lock the bolt to the nut member 6.

The parts or member 1 and 2 for this rivetable nut can be made as follows. A metal strip is provided having a machined, longitudinal groove later to correspond to groove 5. Individual parts are then stamped or punched out of that strip. The bores 2, 3, and 4 may be provided before or after punching. However, if the punching and drilling tools are sufficiently accurately aligned and synchronized, it is easier to drill the several bores first. The strip shall be stepped through the drilling tool for each set of bores to be made around which subsequently stamping or punching is carried out.

After the threaded member has been made and particularly been provided with the annular grooves and flanges, socket and threaded members are put together and now one needs merely lateral upsetting as stated above to loosely fasten the two members together. This connection is not affected by any subsequent riveting of socket member 1. The radial upsetting of the shank is carried out in situ, i.e., after the threaded connection has been made and completed.

The invention is not limited to the embodiments described above but all changes and modifications thereof not constituting departures from the spirit and scope of the invention are intended to be included.

I claim:

1. A two-part nut having a socket member and a threaded member, the socket member having a central bore and two additional bores for riveting, the threaded member having a shank with internal threading, the improvement comprising:

the socket member being flat but having a groove in the central portion of the socket member on one side thereof and having a bottom and two parallel sides, said central bore traversing the bottom of the groove, thereby establishing two arcuate bars between portions of the member having said additional bores, said arcuate bars having been deformed so that said central bore has a smaller diameter transversely to the direction of arrangement of said additional bores than in said direction; the other side of the socket member being flat;

a flange on the shank of said threaded member having two parallel sides being spaced slightly less than the groove is wide as between said two sides of the groove, the flange being thinner than the groove is deep;

the outer diameter of the shank corresponding to the largest diameter of the central bore so that the shank did pass through the central bore prior to reduction of the bore to said smaller diameter; and the shank of the threaded member having an annular pre-cut groove adjacent the flange not resulting from any upsetting of the shank and receiving said bars, the shank above the groove having larger diameter than said smaller diameter prior as well as subsequently to insertion of the shank in said central bore.

2. A nut as in claim 1, said shank being upset at plural points for distorting the inner dimensions of the threaded shank.

* * * * *

UNITED STATES PATENT AND TRADEMARK OFFICE
CERTIFICATE OF CORRECTION

PATENT NO. : 4,026,341
DATED : May 31, 1977
INVENTOR(S) : Manfred Menke

It is certified that error appears in the above-identified patent and that said Letters Patent are hereby corrected as shown below:

[30] Foreign Application Priority Data

December 19, 1974

*Signed and Sealed this*

*Twenty-seventh* Day of *September 1977*

[SEAL]

Attest:

RUTH C. MASON
*Attesting Officer*

LUTRELLE F. PARKER
*Acting Commissioner of Patents and Trademarks*